United States Patent
Tochihara et al.

(10) Patent No.: US 9,783,638 B2
(45) Date of Patent: Oct. 10, 2017

(54) XYLYLENEDIAMINE COMPOSITION AND METHOD FOR PRODUCING POLYAMIDE RESIN

(71) Applicant: Mitsubishi Gas Chemical Company, Inc., Tokyo (JP)

(72) Inventors: Tatsuya Tochihara, Niigata (JP); Katsumi Shinohara, Niigata (JP); Takashi Nakamura, Niigata (JP); Hajime Yamada, Niigata (JP); Jun Mitadera, Kanagawa (JP); Takashi Yamamoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 15/032,029

(22) PCT Filed: Oct. 29, 2014

(86) PCT No.: PCT/JP2014/078732
§ 371 (c)(1),
(2) Date: Apr. 25, 2016

(87) PCT Pub. No.: WO2015/064624
PCT Pub. Date: May 7, 2015

(65) Prior Publication Data
US 2016/0257784 A1 Sep. 8, 2016

(30) Foreign Application Priority Data

Oct. 31, 2013 (JP) .................. 2013-227231
Oct. 31, 2013 (JP) .................. 2013-227244

(51) Int. Cl.
| | |
|---|---|
| C08G 69/26 | (2006.01) |
| C08G 69/06 | (2006.01) |
| C08L 77/06 | (2006.01) |
| C08G 69/28 | (2006.01) |
| C08G 59/50 | (2006.01) |
| C08L 79/02 | (2006.01) |

(52) U.S. Cl.
CPC .......... *C08G 69/06* (2013.01); *C08G 59/5033* (2013.01); *C08G 69/26* (2013.01); *C08G 69/265* (2013.01); *C08G 69/28* (2013.01); *C08L 77/06* (2013.01); *C08G 59/50* (2013.01); *C08L 79/02* (2013.01)

(58) Field of Classification Search
CPC .......... C08L 77/06; C08L 79/02; C08G 69/26
See application file for complete search history.

(56) References Cited

U.S. PATENT DOCUMENTS

| | | |
|---|---|---|
| 2012/0146266 A1 | 6/2012 | Oda et al. |
| 2012/0302723 A1 | 11/2012 | Oda et al. |
| 2013/0123439 A1* | 5/2013 | Mitadera ................ C08G 69/26 525/92 B |

FOREIGN PATENT DOCUMENTS

| | | |
|---|---|---|
| JP | S59-25674 B2 | 6/1984 |
| JP | H1-128937 A | 5/1989 |
| JP | H11-158370 A | 6/1999 |
| JP | 2003-26797 A | 1/2003 |

OTHER PUBLICATIONS

International Search Report date of mailing Feb. 3, 2015 for PCT/JP2014/078732 and English translation of the same (2 pages).
Extended European Search Report mailed in corresponding European Application No. 14858616 dated Jun. 12, 2017 (5 pages).

* cited by examiner

*Primary Examiner* — Gregory Listvoyb
(74) *Attorney, Agent, or Firm* — Fitch, Even, Tabin & Flannery LLP

(57) ABSTRACT

Provided are [1] a xylylenediamine composition containing xylylenediamine and 1,2-ditolylethane wherein the content of 1,2-ditolylethane is 0.001 to 0.02 parts by mass based on 100 parts by mass of the xylylenediamine; and [2] a method for producing a polyamide resin including the steps of introducing a diamine containing xylylenediamine, a dicarboxylic acid, and 1,2-ditolylethane into a reaction system and performing polycondensation reaction, wherein the amount of the 1,2-ditolylethane to be introduced is 0.001 to 0.02 parts by mass based on 100 parts by mass of the xylylenediamine.

13 Claims, No Drawings

XYLYLENEDIAMINE COMPOSITION AND METHOD FOR PRODUCING POLYAMIDE RESIN

CROSS-REFERENCE TO RELATED APPLICATIONS

This application is a U.S. national phase application filed under 35 U.S.C. §371 of International Application PCT/JP2014/078732, filed Oct. 29, 2014, designating the United States, which claims priority from Japanese Application Number 2013-227231, filed Oct. 31, 2013, and Japanese Application Number 2013-227244, filed Oct. 31, 2013 which are hereby incorporated herein by reference in their entirety.

TECHNICAL FIELD

The present invention relates to a xylylenediamine composition and a method for producing a polyamide resin.

BACKGROUND ART

Xylylenediamine is a compound useful as a raw material for polyamide resin, an epoxy resin curing agent, and a raw material for isocyanate compound or the like. Polyamide resin using xylylenediamine as a main diamine component are excellent in mechanical properties such as strength, elastic modulus and others, and are therefore useful as various molding materials. In addition, the polyamide resins are excellent in gas barrier performance against oxygen, carbon dioxide gas and others, and are therefore useful also as packaging materials. However, it is known that xylylenediamine is apt to be changed in quality and colored due to light, heat, oxygen, or the like.

In addition, the polyamide resins using xylylenediamine as a main diamine component involve such a problem that when exposed to a high-temperature atmosphere in a molten state or solid state, they are apt to be colored yellow, and their use was sometimes limited depending upon an application.

As a method for solving the above-described problem, for example, PTL 1 discloses a polyamide resin resulting from polycondensation of a diamine containing xylylenediamine with a specified aliphatic dicarboxylic acid, in which a purity of the xylylenediamine used as the raw material diamine is 99.9% by weight or more and on heating the resin under a prescribed condition, a difference of a yellowness index (YI value) before and after heating is within 5.

Meanwhile, in order to improve molding processability or the like of a polyamide resin, it is known to add a crystal nucleating agent to the polyamide resin, thereby improving a crystallization rate (PTL 2). However, the case where a crystal nucleating agent or the like is added to a polyamide resin requires an additional step of mixing the crystal nucleating agent to the polyamide resin before molding. In addition, when the dispersed condition of the crystal nucleating agent is nonuniform in the polyamide resin, there is a concern that mechanical physical properties and transparency of the molded articles of a composition containing a polyamide resin are often lowered.

CITATION LIST

Patent Literature

PTL 1: JP-A 2003-26797
PTL 2: JP-A H11-158370

SUMMARY OF INVENTION

An object of the present invention is to provide a xylylenediamine composition which can be used as a raw material for polyamide resin, an epoxy resin curing agent, or a raw material for isocyanate compound or the like, and in particular, when used as a raw material for polyamide resin, can increase the crystallization rate of polyamide resin and can provide a polyamide resin that is colored little and has high transparency.

In addition, another object of the present invention is to provide a method for producing a polyamide resin using xylylenediamine as a diamine component, which can produce a polyamide resin capable of readily producing molded articles that are colored little and have high transparency, and in which the crystallization rate of the polyamide resin can be increased without degrading the physical properties thereof.

The present inventors have found that by incorporating a specified amount of a specified compound into xylylenediamine, and by reacting a diamine containing xylylenediamine with a dicarboxylic acid under a specified condition, the above-mentioned problems can be solved.

Specifically, the present invention provides [1] a xylylenediamine composition containing xylylenediamine and 1,2-ditolylethane represented by the following formula (1) wherein the content of the 1,2-ditolylethane is 0.001 to 0.02 parts by mass based on 100 parts by mass of the xylylenediamine; and [2] a method for producing a polyamide resin including the steps of introducing a diamine containing xylylenediamine, a dicarboxylic acid, and 1,2-ditolylethane represented by the following formula (1) into a reaction system and performing a polycondensation reaction, wherein the amount of the 1,2-ditolylethane to be introduced is 0.001 to 0.02 parts by mass based on 100 parts by mass of the xylylenediamine.

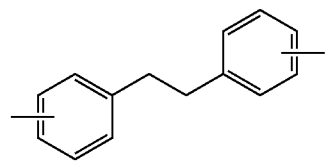

(1)

When the xylylenediamine composition of the present invention is used as a raw material for polyamide resin, a polyamide resin that is colored little and has a high crystallization rate can be obtained. In addition, the xylylenediamine composition of the present invention is also suitable for various applications for an epoxy resin curing agent and the like, or as a raw material for isocyanate compound.

Furthermore, according to the present invention, even when a polyamide resin is produced on the basis of hitherto-known production conditions for polyamide resin, a polyamide resin having a high crystallization rate can be produced without degrading the physical properties of the polyamide resin. With the increase in the crystallization rate thereof, the molding processability of the polyamide resin is improved. In addition, when the polyamide resin is used, molded articles that are colored little and have high transparency can be produced, and therefore the polyamide resin can be favorably used as a material for packaging films, hollow containers, various molding materials, fibers, etc.

DESCRIPTION OF EMBODIMENTS

[Xylylenediamine Composition]

The xylylenediamine composition of the present invention (hereinafter also referred to simply as "composition of the present invention" or "composition") contains xylylenediamine and 1,2-ditolylethane, wherein the content of the 1,2-ditolylethane is 0.001 to 0.02 parts by mass based on 100 parts by mass of the xylylenediamine.

<Xylylenediamine>

The xylylenediamine which is used in the composition of the present invention is preferably m-xylylenediamine, p-xylylenediamine, or a mixture thereof, and from the viewpoint of gas barrier properties of the resulting polyamide resin, the xylylenediamine is more preferably m-xylylenediamine. In addition, on processing into an injection molding material, from the viewpoints that the molding cycle is fast and that the strength and appearance of a molded article are improved, the xylylenediamine is more preferably a mixture of m-xylylenediamine and p-xylylenediamine.

The composition of the present invention contains xylylenediamine as a main component, and a content of the xylylenediamine in the composition is preferably 99.5% by mass or more, and more preferably 99.9% by mass or more.

It should be noted that the content of the xylylenediamine in the composition may be measured by, for example, gas chromatography (GC) analysis or the like.

As the xylylenediamine which is used in the composition of the present invention, industrially available xylylenediamine may be suitably used. Although such xylylenediamine sometimes contains a trace amount of impurities, there is no particular fault in the present invention.

The industrially available xylylenediamine may be produced by adopting a known method. For example, in the case where the xylylenediamine is m-xylylenediamine, examples of a production method thereof include a method of allowing m-xylene, ammonia, and an oxygen-containing gas to react with each other in the presence of a catalyst by a continuous reaction or a batch reaction, followed by hydrogenating formed isophthalonitrile; and the like.

<1,2-Ditolylethane>

The composition of the present invention contains a predetermined amount of 1,2-ditolylethane represented by the following formula (1).

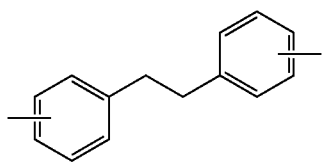

(1)

Accordingly, when the xylylenediamine composition of the present invention is used as a raw material for polyamide resin, the resultant polyamide resin is colored little while maintaining high transparency, and has a high crystallization rate. With the increase in the crystallization rate of the polyamide resin, the molding processability thereof improves, and therefore the time for the crystallization step in molding can be shortened, and the productivity of molded articles can be improved.

According to the present invention, the above-mentioned effects can be realized, and therefore problems of degradation of mechanical physical properties and transparency owing to addition of a crystal nucleating agent for improving the molding processability of polyamide resin can be avoided. In addition, a polyamide resin capable of producing molded articles that are colored little and have high transparency can be obtained with ease.

The 1,2-ditolylethane content in the composition is 0.001 to 0.02 parts by mass based on 100 parts by mass of xylylenediamine therein, preferably 0.001 to 0.01 parts by mass, more preferably 0.001 to 0.007 parts by mass, even more preferably 0.001 to 0.005 parts by mass. When the 1,2-ditolylethane content in the composition is less than 0.001 parts by mass based on 100 parts by mass of xylylenediamine therein, and when the composition is used as a raw material, the YI value of the resultant polyamide resin increases. In addition, the crystallization rate of the polyamide resin lowers and, as a result, the molding processability thereof worsens. On the other hand, when the 1,2-ditolylethane content in the composition is more than 0.02 parts by mass based on 100 parts by mass of xylylenediamine therein, and when the composition is used as a raw material, the YI value of the resultant polyamide resin increases.

In the present invention, "1,2-ditolylethane content" means the total content of 1,2-di-o-tolylethane, 1,2-di-m-tolylethane and 1,2-di-p-tolylethane.

Although a reason why the above-described effects are obtained by using the composition of the present invention as a raw material for polyamide resin is not always elucidated yet, as for reduction in coloration of the polyamide resin, it may be considered that 1,2-ditolylethane may have an effect for capturing a radical emitted from the polyamide resin resulting from a polycondensation reaction between a diamine and a dicarboxylic acid, and therefore, deterioration of the polyamide resin to be caused due to the radical could be suppressed. In addition, as for the effect for improving the crystallization rate of the polyamide resin, it may be considered that 1,2-ditolylethane may promote the crystal nucleus formation in the polyamide resin, or 1,2-ditolylethane itself serves as a starting point of the crystal nucleus formation.

In addition, in the xylylenediamine, there may be the case where an amino group in the molecule deteriorates at the storage to generate a trace amount of ammonia; however, it has also been found that the generation amount of ammonia is decreased due to the presence of 1,2-ditolylethane. From this matter, in view of the fact that the xylylenediamine composition contains 1,2-ditolylethane, an effect that the storage stability of the xylylenediamine is improved may also be expected.

Although a reason why the generation amount of ammonia is decreased is not always elucidated yet, it may be assumed that an effect for preventing the generation of a radical or its chain is brought due to some interaction between xylylenediamine and 1,2-ditolylethane.

The xylylenediamine composition of the present invention may be obtained by using commercially available xylylenediamine and 1,2-ditolylethane and controlling an amount of the 1,2-ditolylethane relative to the xylylenediamine to a prescribed range. In addition, in producing xylylenediamine, so long as it is possible to control the catalyst used or the production condition to a specified constitution and to perform the reaction so as to form a prescribed amount of the 1,2-ditolylethane in parallel, there are exemplified a method of utilizing it; and the like. In this case, the content of 1,2-ditolylethane in the composition may be determined by gas chromatography (GC) analysis or the like. For example, there are exemplified a method in which a xylylenediamine composition containing 1,2-ditolylethane is subjected to GC measurement, and the amount of 1,2-ditolylethane relative to xylylenediamine is determined from a ratio of a peak value assigned to the 1,2-ditolylethane to a peak value assigned to the xylylenediamine; and the like.

The xylylenediamine composition of the present invention may be suitably used for a raw material for polyamide resin, an epoxy resin curing agent, a raw material for isocyanate compound, or the like.

In particular, the case where the xylylenediamine composition of the present invention is used for a raw material for polyamide resin is preferred from the standpoint that a polyamide resin that is colored little and has a high crystallization rate may be produced. In the case where the xylylenediamine composition of the present invention is used as an epoxy resin curing agent, it realizes long-term storability and excellent handleability since the xylylenediamine storage stability is enhanced, and in addition, the epoxy resin curing agent may have a low viscosity since 1,2-ditolylethane imparts suitable flowability thereto, and consequently, the appearance of the coating film to be obtained may also be excellent.

In the case where the xylylenediamine composition of the present invention is used as a raw material for polyamide resin, for example, a diamine component containing the xylylenediamine composition of the present invention and a dicarboxylic acid component are introduced into a reaction system and are reacted for polycondensation according to a known method to produce a polyamide resin.

In the case where the xylylenediamine composition of the present invention is used as an epoxy resin curing agent, the xylylenediamine composition of the present invention may be used as a curing agent directly as it is; or a reaction product produced by reacting the xylylenediamine composition of the present invention with a carbonyl group-containing compound such as a carboxylic acid or a derivative thereof according to a known method may be used as an epoxy resin curing agent. Examples of the carboxylic acid derivative include carboxylic acid anhydrides and acid chlorides.

For producing the epoxy resin curing agent, if desired, any other component may be used concurrently.

In addition, the xylylenediamine composition of the present invention is also favorable as a raw material for isocyanate compound. The isocyanate compound is used as a raw material for urethane resin and urea resin.

[Production Method for Polyamide Resin]

The production method for a polyamide resin of the present invention includes the steps of introducing a diamine containing xylylenediamine, a dicarboxylic acid, and 1,2-ditolylethane represented by the above-mentioned formula (1) into a reaction system and performing a polycondensation reaction, wherein the amount of the 1,2-ditolylethane to be introduced is 0.001 to 0.02 parts by mass based on 100 parts by mass of the xylylenediamine.

The production method for a polyamide resin of the present invention preferably uses the above-mentioned xylylenediamine composition of the present invention, but is not limited to using it.

<Diamine Containing Xylylenediamine>

The diamine which is used in the production method of the present invention is a diamine containing xylylenediamine (hereinafter also referred to simply as "diamine"). The xylylenediamine is preferably m-xylylenediamine, p-xylylenediamine, or a mixture thereof, and more preferably m-xylylenediamine from the viewpoint of gas barrier properties of the resulting polyamide resin. By using the xylylenediamine-containing diamine, the resulting polyamide resin is excellent in melt moldability, mechanical properties, and gas barrier properties.

A content of the xylylenediamine in the diamine is preferably 70 mol % or more, more preferably 80 to 100 mol %, and still more preferably 90 to 100 mol %. So long as the content of the xylylenediamine in the diamine falls within the foregoing range, the resulting polyamide resin is excellent in melt moldability, mechanical properties, and gas barrier properties.

Examples of other diamine compound than the xylylenediamine, which is contained in the diamine, may include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, 2,4,4-trimethylhexamethylenediamine, etc.; alicyclic diamines, such as 1,3-bis(aminomethyl)-cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)-propane, bis(aminomethyl) decalin, bis(aminomethyl)tricyclodecane, etc.; diamines having an aromatic ring, such as bis(4-aminophenyl) ether, p-phenylenediamine, bis(aminomethyl)-naphthalene, etc.; and the like; however, the diamine compound is not limited thereto. These diamines may be used solely or in combination of two or more kinds thereof.

<Dicarboxylic Acid>

Although the dicarboxylic acid which is used in the production method of the present invention is not particularly limited, from the viewpoints of molding processability, gas barrier properties, and mechanical properties, it is preferably at least one selected from an aliphatic dicarboxylic acid having 4 to 20 carbon atoms, terephthalic acid, and isophthalic acid, more preferably an aliphatic dicarboxylic acid having 4 to 20 carbon atoms, and still more preferably an aliphatic dicarboxylic acid having 4 to 12 carbon atoms.

Examples of the aliphatic dicarboxylic acid having 4 to 20 carbon atoms may include succinic acid, glutaric acid, adipic acid, pimelic acid, suberic acid, azelaic acid, sebacic acid, 1,10-decanedicarboxylic acid, 1.1 1-undecanedicarboxylic acid, 1,12-dodecanedicarboxylic acid, 1,14-tetradecanedicarboxylic acid, 1,16-hexadecanedicarboxylic acid, 1,18-octadecanedicarboxylic acid, and the like. Of these, at least one selected from adipic acid and sebacic acid is preferably used from the viewpoints of crystallinity and high elasticity. These dicarboxylic acids may be used solely or in combination of two or more kinds thereof.

Examples of other dicarboxylic acid which may be used as the dicarboxylic acid include aliphatic dicarboxylic acid having 3 carbon atoms or less, such as oxalic acid, malonic acid, etc., and other aromatic dicarboxylic acids than terephthalic acid and isophthalic acid, such as 2,6-naphthalenedicarboxylic acid, etc.

A content of the aliphatic dicarboxylic acid having 4 to 20 carbon atoms in the dicarboxylic acid is preferably 50 mol % or more, more preferably 70 to 100 mol %, and still more preferably 85 to 100 mol %. So long as the content of the aliphatic dicarboxylic acid having 4 to 20 carbon atoms in the dicarboxylic acid falls within the foregoing range, the resulting polyamide resin is excellent in molding processability, gas barrier properties, and mechanical properties.

<1,2-Ditolylethane>

The production method for a polyamide resin of the present invention includes the steps of introducing a diamine containing xylylenediamine and a dicarboxylic acid both mentioned above, and also a predetermined amount of 1,2-ditolylethane represented by the following formula (1) into a reaction system and performing a polycondensation reaction.

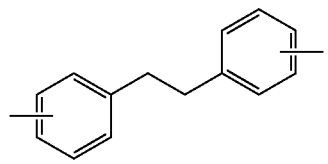

(1)

Having the above-mentioned step, the polyamide resin to be obtained according to the production method of the present invention is less in coloration and can have a high crystallization rate while maintaining high transparency. With the increase in the crystallization rate of the polyamide resin, the molding processability thereof improves, and therefore the time for the crystallization step in molding can be shortened, and the productivity of molded articles can be improved.

According to the production method of the present invention, the above-mentioned effects can be realized, and therefore problems of degradation of mechanical physical properties and transparency owing to addition of a crystal nucleating agent for improving the molding processability of polyamide resin can be avoided. In addition, a polyamide resin capable of readily producing molded articles that are colored little and have high transparency can be obtained.

The amount of 1,2-ditolylethane to be introduced into the reaction system is 0.001 to 0.02 parts by mass based on 100 parts by mass of xylylenediamine in the above-mentioned diamine, preferably 0.001 to 0.01 parts by mass, more preferably 0.001 to 0.007 parts by mass, even more preferably 0.001 to 0.005 parts by mass. When the amount of 1,2-ditolylethane introduced is less than 0.001 parts by mass based on 100 parts by mass of xylylenediamine, the YI value of the resultant polyamide resin increases. In addition, the crystallization rate of the polyamide resin lowers and, as a result, the molding processability of the polyamide resin worsens. When the amount of 1,2-ditolylethane introduced is more than 0.02 parts by mass based on 100 parts by mass of xylylenediamine, the YI value of the polyamide resin increases.

In the production method of the present invention, "amount of 1,2-ditolylethane introduced" means the total amount of 1,2-di-o-tolylethane, 1,2-di-m-tolylethane and 1,2-di-p-tolylethane introduced.

Although a reason why the above-described effects are obtained by introducing a predetermined amount of 1,2-ditolylethane into the reaction system for polycondensation reaction is not always elucidated yet, as for reduction in coloration of the polyamide resin, it may be considered that 1,2-ditolylethane may have an effect for capturing a radical emitted from the polyamide resin resulting from a polycondensation reaction between a diamine and a dicarboxylic acid, and therefore, deterioration of the polyamide resin to be caused due to the radical could be suppressed. In addition, as for the effect for improving the crystallization rate of the polyamide resin, it may be considered that 1,2-ditolylethane may promote the crystal nucleus formation in the polyamide resin, or 1,2-ditolylethane itself serves as a starting point of the crystal nucleus formation.

The polycondensation reaction between a diamine and a dicarboxylic acid is not particularly limited, and any method, such as a pressurization method, an atmospheric dropping method, etc., is applicable. As an example thereof, there is exemplified a method of performing melt polycondensation (melt polymerization).

Specifically, there is exemplified a method in which a salt composed of a diamine and a dicarboxylic acid is heated in the presence of water in an atmospheric pressure or pressurized state and subjected to polycondensation in a molten state while removing the added water and water formed by the polycondensation. In addition, there is also exemplified a method in which a diamine is added directly to a dicarboxylic acid in a molten state, followed by performing polycondensation at atmospheric pressure or under an elevated pressure. In this case, in order to keep the reaction system in a uniform liquid state, the diamine and the dicarboxylic acid are continuously added, and meanwhile, the polycondensation is advanced while subjecting the reaction system to temperature rise in such a manner that a reaction temperature is not lower than melting points of the formed oligoamide and polyamide.

Among the foregoing, it is preferred to adopt the melt polymerization method in which a diamine is added dropwise in a molten dicarboxylic acid at atmospheric pressure or under an elevated pressure, and the mixture is polymerized in a molten state while removing condensed water, because the molecular weight distribution of the polyamide resin may be made small.

A method of introducing 1,2-ditolylethane into the reaction system is not particularly limited. For example, there are exemplified a method of introducing 1,2-ditolylethane directly into the polycondensation reaction system; and a method of introducing a mixture of the raw material diamine or dicarboxylic acid and 1,2-ditolylethane into the reaction system. For example, the above-described xylylenediamine composition of the present invention may be used as the mixture of the raw material diamine and 1,2-ditolylethane.

In addition, in the production of xylylenediamine which is used in the present invention, so long as it is possible to control the catalyst used or the production condition to a specified constitution and to perform the reaction so as to form a prescribed amount of 1,2-ditolylethane in parallel, there are exemplified a method of utilizing it; and the like. In this case, the content of 1,2-ditolylethane in the xylylenediamine may be measured by gas chromatography (GC) analysis or the like. For example, there are exemplified a method in which xylylenediamine containing 1,2-ditolylethane is subjected to GC measurement, and the content of 1,2-ditolylethane is determined from a ratio of a peak value assigned to xylylenediamine and a peak value assigned to 1,2-ditolylethane; and the like.

A molar ratio of the diamine and the dicarboxylic acid (diamine/dicarboxylic acid) is preferably in the range of 0.9 to 1.1, more preferably in the range of 0.93 to 1.07, still more preferably in the range of 0.95 to 1.05, and yet still more preferably in the range of 0.97 to 1.02. So long as the molar ratio falls within the foregoing range, an increase of the molecular weight is apt to be advanced.

In addition, for the purpose of promoting the amidation reaction, a phosphorus atom-containing compound may be added within the polycondensation reaction system. Examples of the phosphorus atom-containing compound include phosphinic acid compounds, such as dimethylphosphinic acid, phenylmethylphosphinic acid, etc.; hypophosphorous acid compounds, such as hypophosphorous acid, sodium hypophosphite, potassium hypophosphite, lithium hypophosphite, magnesium hypophosphite, calcium hypophosphite, ethyl hypophosphite, etc.; phosphonic acid compounds, such as phosphonic acid, sodium phosphonate, potassium phosphonate, lithium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, ethyl phenylphosphonite, etc.; phosphorous acid compounds, such as phosphorous acid, sodium hydrogenphosphate, sodium phosphite, lithium phosphite, potassium phosphite, magnesium phosphite, calcium phosphite, triethyl phosphite, triphenyl phosphite, pyrophosphorous acid, etc.; and the like.

Of these phosphorus atom-containing compounds, in particular, hypophosphorous acid metal salts, such as sodium hypophosphite, potassium hypophosphite, lithium hypophosphite, etc., are preferably used because they promote the amidation reaction, with sodium hypophosphite being especially preferred. It should be noted that the phosphorus atom-containing compound which may be used in the present invention is not limited to these compounds.

An addition amount of the phosphorus atom-containing compound which is added to the polycondensation reaction system is, from the viewpoint of promoting the amidation reaction, preferably 0.1 to 1,000 ppm, more preferably 1 to 600 ppm, and still more preferably 5 to 400 ppm in terms of a phosphorus atom concentration in the polyamide resin.

In addition, from the viewpoint of controlling a polycondensation reaction rate, an alkali metal compound may be allowed to be further coexistent within the polymerization reaction system.

As the alkali metal compound, an alkali metal hydroxide or an alkali metal acetate is usually used. However, the above-described phosphorus atom-containing compounds containing an alkali metal are excluded. Examples of the alkali metal compound include lithium hydroxide, sodium hydroxide, potassium hydroxide, rubidium hydroxide, cesium hydroxide, lithium acetate, sodium acetate, potassium acetate, rubidium acetate, cesium acetate, and the like, and at least one selected from sodium hydroxide and sodium acetate is preferred. These alkali metal compounds may be used solely or in combination of two or more kinds thereof.

It should be noted that the alkali metal compound may be added within the polycondensation reaction system, or may be one originated from the dicarboxylic acid that is a raw material for polyamide resin.

A use amount of the alkali metal compound is preferably 0.05 to 1,000 ppm, more preferably 0.5 to 600 ppm, still more preferably 2.5 to 400 ppm, in terms of an alkali metal atom concentration in the polyamide resin. The use amount is a total amount of the alkali metal compound added within the polycondensation system and the alkali metal compound originated from the dicarboxylic acid that is a raw material for polyamide resin.

In addition, as for the use amount of the alkali metal compound, a value obtained by dividing a molar number of the alkali metal compound by a molar number of the above-described phosphorus atom-containing compound is usually a value in the range of 0.5 to 1.0, and the use amount is a value in the range of preferably 0.55 to 0.95, and more preferably 0.6 to 0.9. So long as the use amount falls within the foregoing range, the amidation reaction proceeds at an appropriate rate.

The phosphorus atom concentration and the alkali metal atom concentration in the polyamide resin may be measured by a known method, such as ICP emission spectral analysis, ICP mass analysis, X-ray photoelectron spectroscopic analysis, etc.

A temperature of the polycondensation reaction is preferably 150 to 300° C., more preferably 160 to 280° C., and still more preferably 170 to 270° C. So long as the polymerization temperature falls within the foregoing range, the polymerization reaction is rapidly advanced. In addition, thermal decomposition of the monomers, or the oligomers, polymers, or the like on the way of polymerization hardly takes place, and therefore, properties of the resulting polyamide resin become favorable.

A time of the polycondensation reaction is usually 1 to 5 hours after starting the dropwise addition of the diamine. So long as the polycondensation reaction time falls within the foregoing range, the molecular weight of the polyamide resin may be thoroughly increased, and coloration of the resulting polyamide resin may be more suppressed.

The thus obtained polyamide resin is taken out from a polymerization tank and pelletized, and the resulting pellets are then used upon drying or crystallization, if desired.

In addition, in order to increase a polymerization degree of the polyamide resin, the production method of the present invention may further include the step of performing solid-phase polymerization. The solid-phase polymerization may be performed by a known method, and for example, there is exemplified a method of performing heating in a nitrogen atmosphere at a temperature of 100° C. or higher and lower than a melting point of the polyamide for 1 to 24 hours.

As a heating device to be used for drying or solid-phase polymerization, a continuous heat drying device, a rotary drum-type heating device called a tumble dryer, a conical dryer, or a rotary dryer, and a cone-shaped heating device equipped with a rotary blade on its inside, called a Nauta mixer, may be suitably used. However, the heating device is not limited thereto, and a known device may be used.

From the viewpoints of moldability and mechanical properties, a relative viscosity of the thus produced polyamide resin is preferably in the range of 1.0 to 5.0, and more preferably in the range of 1.5 to 4.0. Specifically, the relative viscosity of the polyamide resin may be measured by the method described in the working examples.

From the viewpoints of melt moldability and mechanical properties, a number average molecular weight (Mn) of the polyamide resin resulting from the production method of the present invention is in the range of preferably 10,000 to 50,000, and more preferably 12,000 to 40,000. It should be noted that specifically, the number average molecular weight of the polyamide resin may be measured by the method described in the working examples.

The polyamide resin resulting from the production method of the present invention is less in coloration as compared with the case where the introduction amount of 1,2-ditolylethane into the reaction system falls outside the scope defined in the present application.

A YI value of the polyamide resin measured in conformity with IS K7373 may be made to be in the range of preferably −20 to 5, and more preferably −20 to 2. It should be noted that specifically, the YI value of the polyamide resin may be measured by the method described in the working examples.

By using the polyamide resin obtained according to the production method of the present invention, molded articles having high transparency can be produced. In addition, it is possible to avoid problems of reduction in the transparency of the polyamide resin owing to addition of a crystal nucleating agent thereto, and therefore, when the polyamide resin is formed into a film having a thickness of 100 µm, the haze thereof may be controlled to be preferably 10% or less, more preferably 5% or less, even more preferably 2% or less, still more preferably 1% or less, especially more preferably 0.2% or less. The haze value may be measured by using a turbidity meter (Model: COH-300A, manufactured by Nippon Denshoku Industries Co., Ltd.), and specifically, the haze value may be measured by the method described in the working examples.

In addition, the polyamide resin obtained according to the production method of the present invention may have a crystallization rate higher than that in the case where the amount of 1,2-ditolylethane introduced into the reaction system is less than 0.001 parts by mass based on 100 parts by mass of xylylenediamine in the diamine to be used. For that reason, the molding processability of the polyamide resin is improved, so that a crystallization process time at the molding may be shortened, namely the molding cycle becomes fast, whereby the productivity of a molded article may be improved. In addition, problems such as lowering in mechanical physical properties of the molded article, etc., which may be caused by a crystal nucleating agent added for improving the molding processability of the polyamide resin, may be avoided.

The crystallization rate of polyamide resin may be evaluated by measuring the semi-crystallization time. Here, the semi-crystallization time means the time taken until crystallization has proceeded by a half in the case where a crystalline material changes from a molten state to a crystallized state, and a material having a shorter semi-crystallization time can be said to have a higher crystallization rate.

The semi-crystallization time of the polyamide resin to be obtained according to the production method of the present invention is preferably 100 seconds or less, more preferably 90 seconds or less, even more preferably 88 seconds or less, still more preferably 85 seconds or less. Specifically, the semi-crystallization time may be measured according to the method described in the working examples.

It should be noted that the polyamide resin may be compounded with additives, such as a delustering agent, a heat stabilizer, a weathering stabilizer, an ultraviolet absorber, a plasticizer, a flame retardant, an antistatic agent, an anti-coloring agent, an anti-gelling agent, etc., if desired so long as properties thereof are not impaired.

The polyamide resin resulting from the production method of the present invention may be molded into a variety of forms by a conventionally known molding method. Examples of the molding method may include molding methods, such as injection molding, blow molding, extrusion molding, compression molding, vacuum molding, press molding, direct blow molding, rotational molding, sandwich molding, two-color molding, etc.

In view of the fact that the polyamide resin resulting from the production method of the present invention is fast in crystallization rate, the crystallization process time at the molding may be shortened, namely the molding cycle becomes fast, whereby the productivity may be improved. In addition, the polyamide resin obtained according to the production method of the present invention is suitable for packaging films, hollow containers, various molding materials, fibers, and the like. In addition, since the molded article is less in coloration and is not impaired in transparency, it is especially suitable for packaging films, hollow containers, and the like, for which high transparency is required.

EXAMPLES

The present invention is hereunder described in more detail by way of Examples, but it should not be construed that the present invention is limited thereto. It should be noted that measurement for a variety of items in the Examples was performed by the following methods.

<Relative Viscosity>

0.2 g of a polyamide resin obtained in each of the Examples and Comparative Examples was weighed accurately and dissolved in 20 mL of 96% sulfuric acid with stirring at 20 to 30° C. After the polyamide resin was dissolved completely, 5 mL of the solution was immediately taken into a Canon-Fenske viscometer and allowed to stand in a thermostat bath at 25° C. for 10 minutes, and then a falling time (t) was measured. In addition, a falling time ($t_0$) of the 96% sulfuric acid itself was measured in the same way. A relative viscosity was calculated from t and $t_0$ according to the following equation.

Relative viscosity=$t/t_0$

<Number Average Molecular Weight (Mn)>

A number average molecular weight of a polyamide resin obtained in each of the Examples and Comparative Examples was determined as follows. Namely, first of all, a sample was dissolved in a phenol/ethanol mixed solvent and a benzyl alcohol solvent, respectively, and a carboxyl terminal group concentration and an amino terminal group concentration were determined by means of neutral titration with hydrochloric acid and a sodium hydroxide aqueous solution, respectively. The number average molecular weight was determined from quantitative values of the amino terminal group concentration and the carboxyl terminal group concentration according to the following equation.

Number average molecular weight=2×1,000,000/ ([NH$_2$]+[COOH])

[NH$_2$]: Amino terminal group concentration (µeq/g)
[COOH]: Carboxyl terminal group concentration (µeq/g)

<YI Value>

A YI value was measured in conformity with JIS K7373. The YI value was measured by using polyamide resin pellets obtained in each of the Examples and Comparative Examples with a color difference measurement device (Model: Z-Σ80 Color Measuring System, manufactured by Nippon Denshoku Industries Co., Ltd.).

<Haze Value>

Polyamide resin pellets obtained in each of the Examples and Comparative Examples were dried, and the dried pellets were extruded under a condition of the melting point+20° C. by a uniaxial extruder, thereby fabricating a film having a thickness of 100 µm. A haze value was measured by the transmission method using a turbidity meter (Model: COH-300A, manufactured by Nippon Denshoku Industries Co., Ltd.).

<Semi-Crystallization Time>

Using polyamide resin pellets obtained in each of the Examples and Comparative Examples, a film having a thickness of 100 μm was fabricated in the same way as described above. The film was sandwiched between cover glasses and melted and held at a temperature of the melting point of the polyamide resin+30° C. for 3 minutes, and immediately thereafter, the resultant was cooled by an oil bath at 160° C. A semi-crystallization time was measured by the depolarization light intensity method with a crystallization rate analyzer (Model: MK701, manufactured by Kotaki Seisakusho Co., Ltd.).

In the following Examples, m-xylylenediamine (MXDA) and p-xylylenediamine (PXDA), both of which are manufactured by Tokyo Chemical Industry Co., Ltd., were used. In addition, as 1,2-ditolylethane, 1,2-di-p-tolylethane produced by Aldrich Corporation was used.

Example 1

(Preparation of Xylylenediamine Composition)

A xylylenediamine composition was prepared in such a manner that the content of 1,2-di-p-tolylethane could be 0.004 parts by mass based on 100 parts by mass of m-xylylenediamine.

(Production of Polyamide Resin)

A reaction container equipped with a stirrer, a partial condenser, a total condenser, a thermometer, a dropping funnel, a nitrogen inlet tube, and a strand die was charged with 10 kg (68.43 moles) of adipic acid (manufactured by Rhodia), and after thoroughly purging with nitrogen, the resultant was further heat melted to 170° C. under a small amount of nitrogen stream while stirring the inside of the system. 9.273 kg of the thus obtained xylylenediamine composition (containing 68.08 moles of m-xylylenediamine) was added dropwise to the molten adipic acid under stirring, and the inner temperature was continuously raised to 240° C. over 2.5 hours while discharging formed condensed water to the outside of the system.

After completion of the dropwise addition of the xylylenediamine composition, the inner temperature was raised; at the point of time when the temperature reached 250° C., the inside of the reaction container was evacuated; the inner temperature was further raised; and a melt polycondensation reaction was continued at 255° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 1.

(Solid-Phase Polymerization)

In addition, 500 g of the above-described polyamide resin was charged in a 2-liter eggplant type flask, and after thoroughly purging with nitrogen, the polyamide resin was heated in an oil bath at 190° C. for 4 hours while evacuating, thereby performing solid-phase polymerization. As for the polyamide resin after the solid-phase polymerization, the YI value was measured in the same way as described above. The results are shown in Table 1.

Examples 2 to 3 and Comparative Examples 1 to 2

Xylylenediamine compositions were prepared in the same manner as in Example 1, except that in Example 1, the content of 1,2-di-p-tolylethane in the xylylenediamine composition was respectively changed as shown in Table 1. In addition, using these xylylenediamine compositions, polyamide resins were produced and subjected to the above-described evaluations. The results are shown in Table 1.

TABLE 1

|  |  | Unit | Example 1 | Example 2 | Example 3 | Comparative Example 1 | Comparative Example 2 |
| --- | --- | --- | --- | --- | --- | --- | --- |
| Xylylenediamine composition | Kind of xylylenediamine | — | MXDA | MXDA | MXDA | MXDA | MXDA |
|  | Content of 1,2-di-p-tolylethane *[1] | parts by mass | 0.004 | 0.006 | 0.01 | 0 | 0.05 |
| Polyamide resin | Kind of dicarboxylic acid | — | Adipic acid | Adipic acid | Adipic acid | Adipic acid | Adipic acid |
|  | Not subjected to solid-phase polymerization | Relative viscosity | — | 2.1 | 2.1 | 2.1 | 2.1 | 2.1 |
|  |  | Number average molecular weight | — | 16000 | 16000 | 16000 | 16000 | 16000 |
|  |  | YI value | — | −0.14 | 0.08 | 0.12 | 0.35 | 0.53 |
|  |  | Haze value | % | 0.1 | 0.1 | 0.1 | 0.1 | 0.1 |
|  |  | Semi-Crystallization time | sec | 85 | 83 | 81 | 91 | 80 |
|  | Subjected to solid-phase polymerization | YI value | — | 0.90 | 1.03 | 1.20 | 1.73 | 2.76 |

*[1] Amount based on 100 parts by mass of xylylenediamine

Examples 4 to 5 and Comparative Example 3

Xylylenediamine compositions were prepared in the same manner as in Example 1, except that in Example 1, the content of 1,2-di-p-tolylethane in the xylylenediamine composition was respectively changed as shown in Table 2. In addition, polyamide resins were produced in the same manner as in Example 1, except that in the production of a polyamide resin, 0.438 g of sodium acetate/sodium hypophosphite monohydrate (molar ratio=1/1.5) was added simultaneously with charging of adipic acid, thereby performing a melt polycondensation reaction, followed by subjecting to the above-described evaluations. The results are shown in Table 2.

TABLE 2

|  |  | Unit | Example 4 | Example 5 | Comparative Example 3 |
|---|---|---|---|---|---|
| Xylylenediamine composition | Kind of xylylenediamine | — | MXDA | MXDA | MXDA |
|  | Content of 1,2-di-p-tolylethane *[1] | parts by mass | 0.006 | 0.01 | 0 |
| Polyamide resin | Kind of dicarboxylic acid | — | Adipic acid | Adipic acid | Adipic acid |
| Not subjected to solid-phase polymerization | Relative viscosity | — | 2.1 | 2.1 | 2.1 |
|  | Number average molecular weight | — | 16000 | 16000 | 16000 |
|  | YI value | — | −1.10 | −0.33 | 0.04 |
|  | Haze value | % | 0.1 | 0.1 | 0.1 |
|  | Semi-Crystallization time | sec | 63 | 60 | 70 |
| Subjected to solid-phase polymerization | YI value | — | −7.80 | −4.33 | −3.08 |

*[1] Amount based on 100 parts by mass of xylylenediamine

Example 6

A xylylenediamine composition was prepared in such a manner that the content of 1,2-di-p-tolylethane could be 0.01 parts by mass based on 100 parts by mass of mixed xylylenediamine having a mass ratio of m-xylylenediamine to p-xylylenediamine of 70/30.

A reaction container equipped with a stirrer, a partial condenser, a total condenser, a thermometer, a dropping funnel, a nitrogen inlet tube, and a strand die was charged with 10 kg (68.43 moles) of adipic acid (manufactured by Rhodia) and 13.14 g of sodium acetate/sodium hypophosphite monohydrate (molar ratio=1/1.5), and after thoroughly purging with nitrogen, the resultant was further heat melted to 170° C. under a small amount of nitrogen stream while stirring the inside of the system. 9.274 kg of the thus obtained xylylenediamine composition (containing 47.66 moles of m-xylylenediamine and 20.42 moles of p-xylylenediamine) was added dropwise to the molten adipic acid under stirring, and the inner temperature was continuously raised to 260° C. over 2.5 hours while discharging formed condensed water to the outside of the system.

After completion of the dropwise addition of the xylylenediamine composition, the inner temperature was raised; at the point of time when the temperature reached 270° C., the inside of the reaction container was evacuated; the inner temperature was further raised; and a melt polycondensation reaction was continued at 275° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 3.

In addition, the polyamide resin was subjected to solid-phase polymerization in the same manner as in Example 1, and as for the polyamide resin after the solid-phase polymerization, the YI value was measured in the same way as described above. The results are shown in Table 3.

Comparative Example 4

A polyamide resin was produced in the same manner as in Example 6, except for not using 1,2-di-p-tolylethane and subjected to the above-described evaluations. The results are shown in Table 3.

TABLE 3

|  |  | Unit | Example 6 | Comparative Example 4 |
|---|---|---|---|---|
| Xylylenediamine composition | Kind of xylylenediamine (MXDA/PXDA mass ratio) | — | MXDA/PXDA (70/30) | MXDA/PXDA (70/30) |
|  | Content of 1,2-di-p-tolylethane *[1] | parts by mass | 0.01 | 0 |
| Polyamide resin | Kind of dicarboxylic acid | — | Adipic acid | Adipic acid |
| Not subjected to solid-phase polymerization | Relative viscosity | — | 2.1 | 2.1 |
|  | Number average molecular weight | — | 16000 | 16000 |
|  | YI value | — | −0.46 | 0.55 |
|  | Haze value | % | 0.2 | 0.2 |
|  | Semi-Crystallization time | sec | 5 | 6 |
| Subjected to solid-phase polymerization | YI value | — | −12.22 | −9.30 |

*[1] Amount based on 100 parts by mass of xylylenediamine

Example 7

A xylylenediamine composition was prepared in such a manner that the content of 1,2-di-p-tolylethane could be 0.005 parts by mass based on 100 parts by mass of mixed xylylenediamine having a mass ratio of m-xylylenediamine to p-xylylenediamine of 70/30.

A reaction container equipped with a stirrer, a partial condenser, a total condenser, a thermometer, a dropping funnel, a nitrogen inlet tube, and a strand die was charged with 10 kg (49.4 moles) of sebacic acid (TA Grade, manufactured by Itoh Oil Chemicals Co., Ltd.) and 11.66 g of sodium acetate/sodium hypophosphite monohydrate (molar ratio=1/1.5), and after thoroughly purging with nitrogen, the resultant was further heat melted to 170° C. under a small amount of nitrogen stream while stirring the inside of the system. 6.680 kg of the thus obtained xylylenediamine composition (containing 34.33 moles of m-xylylenediamine and 14.71 moles of p-xylylenediamine) was added dropwise to the molten sebacic acid under stirring, and the inner temperature was continuously raised to 240° C. over 2.5 hours while discharging formed condensed water to the outside of the system.

After completion of the dropwise addition of the xylylenediamine composition, the inner temperature was raised; at the point of time when the temperature reached 250° C., the inside of the reaction container was evacuated; the inner temperature was further raised; and a melt polycondensation reaction was continued at 255° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 4.

In addition, the polyamide resin was subjected to solid-phase polymerization in the same manner as in Example 1, and as for the polyamide resin after the solid-phase polymerization, the YI value was measured in the same way as described above. The results are shown in Table 4.

Example 8

A xylylenediamine composition was prepared in such a manner that the content of 1,2-di-p-tolylethane could be 0.005 parts by mass based on 100 parts by mass of mixed xylylenediamine having a mass ratio of m-xylylenediamine to p-xylylenediamine of 30/70.

A reaction container equipped with a stirrer, a partial condenser, a total condenser, a thermometer, a dropping funnel, a nitrogen inlet tube, and a strand die was charged with 10 kg (49.4 moles) of sebacic acid (TA Grade, manufactured by Itoh Oil Chemicals Co., Ltd.) and 11.66 g of sodium acetate/sodium hypophosphite monohydrate (molar ratio=1/1.5), and after thoroughly purging with nitrogen, the resultant was further heat melted to 170° C. under a small amount of nitrogen stream while stirring the inside of the system. 6.680 kg of the thus obtained xylylenediamine composition (containing 14.71 moles of m-xylylenediamine and 34.33 moles of p-xylylenediamine) was added dropwise to the molten sebacic acid under stirring, and the inner temperature was continuously raised to 262° C. over 2.5 hours while discharging formed condensed water to the outside of the system.

After completion of the dropwise addition of the xylylenediamine composition, the inner temperature was raised; at the point of time when the temperature reached 265° C., the inside of the reaction container was evacuated; the inner temperature was further raised; and a melt polycondensation reaction was continued at 275° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 4.

In addition, the polyamide resin was subjected to solid-phase polymerization in the same manner as in Example 1, and as for the polyamide resin after the solid-phase polymerization, the YI value was measured in the same way as described above. The results are shown in Table 4.

TABLE 4

| | | Unit | Example 7 | Example 8 |
|---|---|---|---|---|
| Xylylenediamine composition | Kind of xylylenediamine (MXDA/PXDA mass ratio) | — | MXDA/PXDA (70/30) | MXDA/PXDA (30/70) |
| | Content of 1,2-di-p-tolylethane [*1] | parts by mass | 0.005 | 0.005 |
| Polyamide resin | Kind of dicarboxylic acid | — | Sebacic acid | Sebacic acid |
| Not subjected to solid-phase polymerization | Relative viscosity | — | 2.26 | 2.26 |
| | Number average molecular weight | — | 15000 | 15000 |
| | YI value | — | 1.37 | 1.09 |
| | Haze value | % | 0.1 | 0.1 |
| | Semi-Crystallization time | sec | 25 | 8 |
| Subjected to solid-phase polymerization | YI value | — | −8.12 | −5.89 |

[*1] Amount based on 100 parts by mass of xylylenediamine

It is noted from the results of Tables 1 to 4 that the polyamide resins obtained by the production method of the present invention using the xylylenediamine composition of the present invention are less in coloration as compared with the polyamide resins of the Comparative Examples. In addition, the polyamide resins obtained by the production method of the present invention using the xylylenediamine composition of the present invention have a higher crystallization rate than the polyamide resins using xylylenediamine not containing 1,2-ditolylethane.

When the xylylenediamine composition of the present invention is used as a raw material for polyamide resin, a polyamide resin that is less in coloration and has a high crystallization rate while maintaining high transparency can be obtained. In addition, the xylylenediamine composition of the present invention is also suitable for various applications for an epoxy resin curing agent and the like, or as a raw material for isocyanate compounds.

In addition, according to the present invention, there can be produced a polyamide resin having a high crystallization rate not degrading the physical properties of the polyamide resin even in the case where polyamide resin is produced on the basis of the production conditions for hitherto-known polyamide resins. With the increase in the crystallization rate of the polyamide resin, the molding processability thereof improves. In addition, when the polyamide resin is used, molded articles that are colored little and have high transparency can be produced, and therefore the polyamide resin is favorably used for materials for packaging films, hollow containers, various molding materials, fibers, and the like.

The invention claimed is:

1. A xylylenediamine composition comprising xylylenediamine and 1,2-ditolylethane, wherein the content of the 1,2-ditolylethane is 0.001 to 0.02 parts by mass based on 100 parts by mass of the xylylenediamine.

2. The xylylenediamine composition according to claim 1, wherein the xylylenediamine is m-xylylenediamine, p-xylylenediamine, or a mixture thereof.

3. The xylylenediamine composition according to claim 1, wherein the xylylenediamine is m-xylylenediamine.

4. The xylylenediamine composition according to claim 1, wherein the content of xylylenediamine is 99.5% by mass or more.

5. The xylylenediamine composition according to claim 1, which is used for a raw material for polyamide resin.

6. The xylylenediamine composition according to claim 1, which is used for an epoxy resin curing agent.

7. A method for producing a polyamide resin comprising the steps of introducing a diamine comprising xylylenediamine, a dicarboxylic acid, and 0.001 to 0.02 parts by mass, based on 100 parts by mass of the xylylenediamine, of 1,2-ditolylethane into a reaction system and performing a polycondensation reaction.

8. The method for producing a polyamide resin according to claim 7, wherein the dicarboxylic acid is at least one selected from an aliphatic dicarboxylic acid having 4 to 20 carbon atoms, terephthalic acid, and isophthalic acid.

9. The method for producing a polyamide resin according to claim 7, wherein the content of xylylenediamine in the diamine is 70 mol % or more, and the content of the aliphatic dicarboxylic acid having 4 to 20 carbon atoms in the dicarboxylic acid is 50 mol % or more.

10. The method for producing a polyamide resin according to claim 8, wherein the aliphatic dicarboxylic acid having 4 to 20 carbon atoms is at least one selected from adipic acid and sebacic acid.

11. The method for producing a polyamide resin according to claim 7, wherein the xylylenediamine is m-xylylenediamine, p-xylylenediamine, or a mixture thereof.

12. The method for producing a polyamide resin according to claim 7, wherein the xylylenediamine is m-xylylenediamine.

13. The method for producing a polyamide resin according to claim 7, further comprising the step of performing solid-phase polymerization.

* * * * *